Nov. 19, 1968   G. M. BELLAIRS   3,411,806
SUSPENSION SYSTEM FOR TRAILERS
Filed Sept. 26, 1966
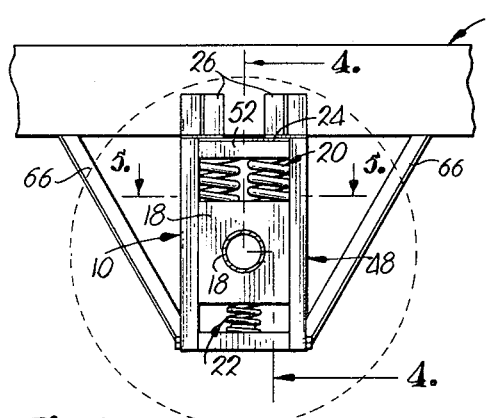
Fig.1.
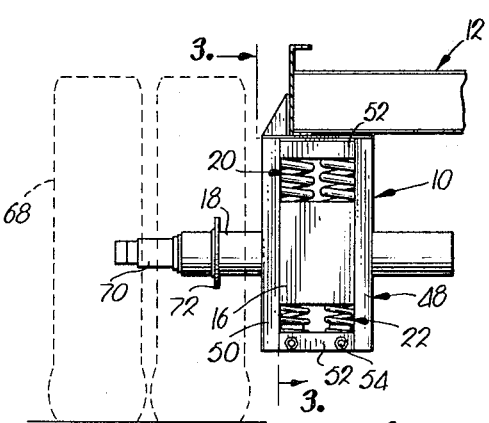
Fig.2.
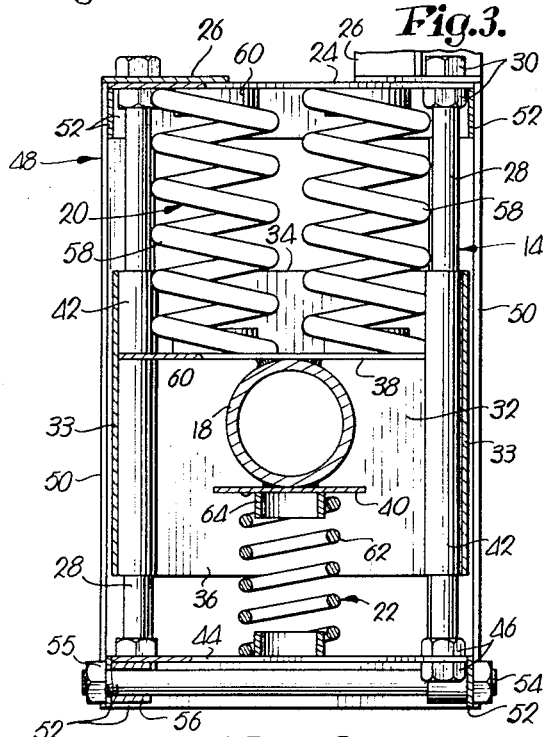
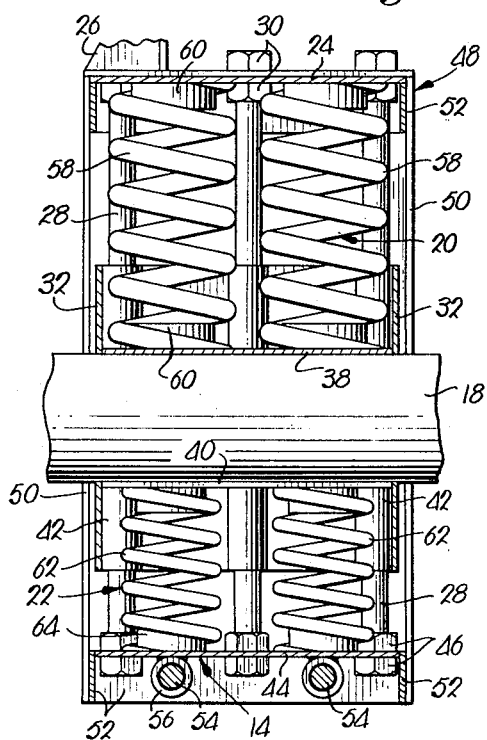
Fig.4.
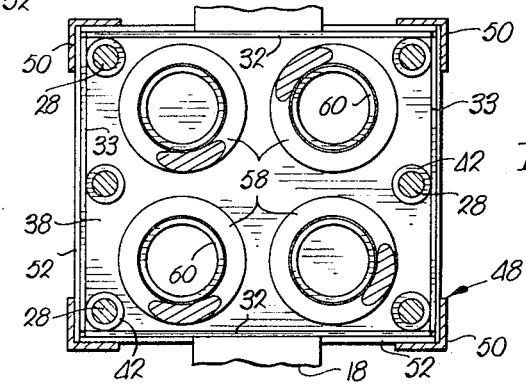
Fig.5.
INVENTOR
George M. Bellairs
BY
Hovey, Schmidt, Johnson & Hovey
ATTORNEYS.

United States Patent Office 3,411,806
Patented Nov. 19, 1968

3,411,806
SUSPENSION SYSTEM FOR TRAILERS
George M. Bellairs, 719 S. Oakland St.,
Webb City, Mo. 64870
Continuation-in-part of application Ser. No. 394,918,
Sept. 8, 1964. This application Sept. 26, 1966, Ser.
No. 581,801
2 Claims. (Cl. 280—124)

ABSTRACT OF THE DISCLOSURE

A suspension unit for vehicles including a frame for attachment to the vehicle, a hollow mount slidably carried within the frame and a stub axle traversing the mount, secured thereto and having at least one wheel carried by an end thereof extending outwardly from the mount. Load cushioning spring means are interposed between the mount and the top of the frame and stabilizing spring means are interposed between the mount and the bottom of the frame, vertical reciprocation of the mount, against said spring means, being permitted by a plurality of uprights which are embraced by corresponding sleeves carried by the mount.

---

This application is a continuation-in-part of application Ser. No. 394,918, filed Sept. 8, 1964, now abandoned.

This invention relates to vehicle suspension systems and, more particularly, to an individual suspension unit which supports a wheel and operates independently of other units in a group.

Freight trailers have heretofore generally been provided iwth tandem spring arrangements employing leaf springs which depend from hangers and support a correspondnig axle of the trailer. These arrangements are inherently weak since the spring itself must bear the braking and turning load of the suspension structure as well as form the shock absorbing system therefor. An acute problem resulting from this arrangement is that upon braking of a moving truck and trailer, the momentum of the trailer and the braking action on the wheel act in opposition and therefore tend to twist the axle and place high stresses on the springs, particularly at their hanger connections. This often causes breakage of the spring or hanger, and even if breakage does not occur, the wheel will not be properly aligned with the truck because of the twisting force on the axle whereby the tire is caused to jump and skid along the road surface creating so-called wheel or axle hop.

Many attempts have been made to alleviate wheel hop, incluuding the utilization of torque arms, specially built hangers, and sundry equalizer designs. However, none of these has suitably solved the problem and generally have just added to the expense of the suspension system. Further, spring designs developed for various smaller vehicles are unsatisfactory for the loads carried by freight trailers.

Accordingly, it is the primary object of my invention to replace the existing conventional tanden-type suspension arrangements normally used in large trailers with a suspension system utilizing independent suspension units, each of which units icludes a novel combiation of axle mounting structure and spring means for eliminating wheel hop while also providing smooth shock-absorbing action.

An important object of this invention is to provide a suspension unit designed to include axle mounting structure and spring means which operate substantially independently for the respective functions of axle alignment and shock absorbing, whereby the spring means will not be subjected to the abnormal stresses created by braking action in suspension systems heretofore utilized.

Yet another object of the instant invention is to provide a suspension unit of the aforementioned character wherein the axle mounting structure is sepecially designed to provide an equalized distribution of the braking stress and thereby preclude the presence of weak points in the suspension system, to the end that the danger of an accident is minimized and maintenance costs are substantially lowered.

Other objects include details of construction which will become apparent from the following specification and accompanying drawing wherein:

FIGURE 1 is a fragmentary, side-elevational view showing my suspension unit, with the wheels attached thereto shown in dashed lines;

FIG. 2 is a rear view thereof;

FIG. 3 is an enlarged, cross-secional view taken along line 3—3 of FIG. 2;

FIG. 4 is an enlarged, cross-sectional view taken along line 4—4 of FIG. 1; and

FIG. 5 is an enlarged, cross-sectional view taken along line 5—5 of FIG. 1.

The individual suspension unit of the present invention, broadly designated by the reference numeral 10, is adapted for attachment to a vehicle 12, and most particularly adapted for use with heavy duty freight trailers. Unit 10 broadly comprises a frame 14 which receives a mount 16 for relative vertical sliding movement. Mount 16 has a horizontal stub axle 18 traversing the same and rigidly secured thereto and is maintained in a normal vertical position by load cushioning spring means 20 disposed above axle 18 and stabilizing spring means 22 disposed below the axle.

Frame 14 includes a top plate 24 adapted to be secured to vehicle 12 by a pair of brackets 26. A plurality of uprights depend from plate 24, and, in the illustrated embodiment, comprise six relatively spaced bolts 28 which are each threaded at both ends. Bolts 28 are disposed in two aligned sets extending parallel to the axis of axle 18, one of the sets being disposed forwardly of axle 18 and the other set rearwardly therof. Bolts 28 extend through suitable corresponding openings in plate 24 and brackets 26 to receive opposed nuts 30 for rigidly securing plate 24 in depending relationship to vehicle 12.

Mount 16 is hollow and is defined by side panels 32 and end panels 33 arranged in a transversely rectangular configuration and presenting an upper open end 34 and lower open end 36. A horizontal partition 38 is welded to side panels 32 within mount 16 below end 34, and a cross member 40 is secured between partition 38 and end 36 and extends longitudinally of axle 18. Axle 18 extends through side panels 32 of mount 16 and is rigidly secured to partition 38 and cross member 40 therebetween.

A plurality of elongated upstanding sleeves 42 extend through partition 38 and are welded or otherwise suitably secured to end panels 33, there being a sleeve 42 aligned with each bolt 28 for surrounding engagement therewith. Mount 16 is thereby slidably carried by bolts 28 for movement relative thereto toward and away from top plate 24 and a bottom plate 44 which is secured to the lower threaded ends of bolts 28 by corresponding opposed nuts 46. Axle 18 is thus disposed in intersecting relationship to the axis of movement of mount 16.

A box-like structure 48 is disposed about frame 14 and comprises angle braces 50 at the vertical edges thereof and a plurality of horizontal bars 52 interconnecting the adjacent inner faces of angle braces 50 at the upper and lower ends thereof. A pair of bolts 54 extend through an opposed pair of lower bars 52, are journalled through corresponding sleeves 56 depending from bottom plate 44 and coupled to nuts 55 to thereby secure structure 48 to frame 14. Structure 48 could also be secured to frame 14 by welding the same to top plate 24.

Load cushioning spring means 20 is interposed between partition 38 and top plate 24, and, in the illustrated embodiment, comprises four coil springs 58 disposed in a pattern surrounding the vertical axis of movement of mount 16. Springs 58 may be maintained in proper position by collars 60 which extend inwardly from top plate 24 and partition 38 for each spring. Stabilizing spring means 22 includes a pair of coil springs 62 interposed between cross member 40 and bottom plate 44. Springs 62 are preferably aligned so that their respective lines of action lie in the vertical plane defined by the axis of axle 18 and the axis of movement of mount 16. Collars 64 on cross member 40 and bottom plate 44 serve to maintain springs 62 in operating position. The opposed ends of springs 58 and 62 engage mount 16 and the corresponding plates, and have a strength proportion to maintain mount 16 in a desired vertical position between plates 24 and 44.

In use, unit 10 is rigidly attached in depending relationship to vehicle 12 by nuts 30 which connect brackets 26 and top plate 24. A pair of diagonal braces 66 may be added to interconnect the lower end of unit 10 to vehicle 12 to further support the unit. Referring to FIG. 2, a wheel assembly 68 is rotatably attached to the spindle 70 of stub axle 18, there being suitable braking means operably coupled to brake flange 72 for stopping wheel assembly 68. A unit 10 is provided for each set of wheels 68 on the trailer whereby the latter is supported by the respective load cushioning spring means 20.

When wheels 68 encounter bumps or depressions in the road surface being traveled over by vehicle 12, the wheels will follow the obstacle and carry mount 16 therewith, the latter vertically sliding relative to bolts 28 against the action of coil springs 58 for shock-absorbing thereby, which absorbing action is stabilized by coil springs 62. The cooperation between sleeves 42 and bolt 28 provides a smooth sliding action for the reason that the springs 58 and 62 are optimumly positioned with respect to the axis of movement of mount 16 and the axis of axle 18 to effect an equalized spring action and thereby prevent binding of mount 16 on bolts 28.

When wheels 68 are braked through flange 72, the momentum of vehicle 12 tends to continue the rectilinear movement of axle 18, while the stopping action of wheels 68 tends to hold the outer end of axle 18 in fixed relationship with the road surface. This tends to twist axle 18 but is combatted by the cooperating surfaces of sleeves 42 and bolts 28 which hold mount 16 and thereby axle 18 in fixed relationship with respect to vehicle 12, to the end that wheels 68 are maintained in parallel relationship with the movement of vehicle 12 and wheel hop is thereby prevented. The opposed momentum and braking forces are absorbed by mount 16 which evenly distributes the stresses thereon to bolts 28. The particular axle mounting arrangement thus is very important in guarding against breakage at some point in suspension unit 10. In addition to the axle twist protection afforded by frame 14, the later is mounted in depending relationship to vehicle 12 so that the load is placed directly over the load cushioning springs 58 rather than, for example, having the springs disposed laterally of the trailer and thereby creating a weak point in the suspension system between the springs and the attachment structure to the vehicle. Since the axle twist forces are absorbed by mount 16 and its associated frame 14, springs 58 and 62 are not stressed in any manner by the braking action, and thus will not be prone to breaking as has been the case with springs heretofore used. The shock absorbing action of the springs may be momentarily stopped when braking of the vehicle leads to binding of mount 16 on bolts 28 to prevent wheel hop, but the shock-absorbing operation is not particularly important during the short time involved.

Having thus described the invention, what is claimed as new and desired to be secured by Letters Patent is:

1. A suspension unit for vehicles comprising:
   a frame having a top, a bottom and a plurality of uprights interconnecting the top and the bottom,
   said top being adapted for rigid attachment to the frame of the vehicle in depending relationship thereto;
   a mount slidably carried by each of said uprights for vertical movement relative thereto toward and away from said top and said bottom;
   a horizontal wheel axle traversing the mount and rigidly secured thereto between said top and bottom in intersecting relationship to the axis of said movement of the mount;
   load cushioning spring means interposed between the mount and said top, said means including a plurality of springs disposed in a pattern surrounding said axis; and
   stabilizing spring means interposed between the mount and said bottom, said means including a pair of springs disposed to lie in a vertical plane defined by said axis of movement and the axis of said axle,
   said mount being hollow and provided with a horizontal cross member extending longitudinally of the axle and rigidly secured to the latter between the stabilizing spring means and the axle, said mount being provided with a horizontal partition interposed between the load carrying spring means and the axle and rigidly secured to the latter,
   there being a plurality of said uprights in spaced apart relationship and disposed forwardly of said axle, and a plurality of said uprights in spaced apart relationship and disposed rearwardly of said axle, said mount having an elongated upstanding sleeve in surrounding engagement with each upright respectively.

2. The invention of claim 1, said axle being a stub axle and having at least one wheel carried by an end thereof extending outwardly from said mount.

References Cited

UNITED STATES PATENTS

| 1,314,982 | 9/1919 | Reed | 267—60 |
| 1,054,590 | 2/1913 | Mesure | 267—60 |
| 1,931,708 | 10/1933 | Ross | 267—60 |

PHILIP GOODMAN, *Primary Examiner.*